United States Patent [19]

Yoshikazu

[11] 4,328,741
[45] May 11, 1982

[54] APPARATUS FOR PRODUCING CRACKERS

[75] Inventor: Hayashi Yoshikazu, Okazaki, Japan

[73] Assignee: Kabushiki Kaisha Airin, Okazaki, Japan

[21] Appl. No.: 152,144

[22] Filed: May 22, 1980

[30] Foreign Application Priority Data

Jun. 6, 1979 [JP] Japan .................................. 54-70995

[51] Int. Cl.³ ............................................. A47J 27/62
[52] U.S. Cl. ........................................ 99/332; 99/355; 99/373; 99/349; 100/93 P; 425/260; 426/523
[58] Field of Search .................. 425/256, 260; 99/349, 99/352, 355, 372, 373; 426/523; 100/93 P, 215

[56] References Cited

U.S. PATENT DOCUMENTS

| | | | |
|---|---|---|---|
| 1,965,082 | 7/1934 | McKee | 99/349 X |
| 3,425,363 | 2/1969 | Carbon | 99/349 X |
| 3,880,064 | 4/1975 | Martinez | 99/349 |
| 3,963,402 | 6/1976 | Berta | 99/372 |

Primary Examiner—Billy J. Wilhite

[57] ABSTRACT

An apparatus for carrying out a method of producing a cracker from a raw material such as rice or the like comprises steps of compressing and heating for a predetermined time the raw material contained within a hermetically closed chamber defind in upper and lower baking molds, expanding instantaneously the compressed and heated raw material by opening the baking molds and concurrently discharging steam produced within the chamber during the compression under heating, and compressing again the expanded material by means of the baking molds thereby shaping the material in a cracker of a desired form in a self-sustaining structure.

2 Claims, 8 Drawing Figures

APPARATUS FOR PRODUCING CRACKERS

BACKGROUND OF THE INVENTION

The present invention relates to an apparatus for producing crackers or the like from a granular material such as rice, corn or the like.

In the hitherto known production of crackers of rice of the like grain, a bonding agent such as sugar, honey or the like has been used, as the result of which natural taste ascribable to the raw material itself has been remarkably modified.

SUMMARY OF THE INVENTION

An object of the invention is to provide an apparatus for producing a cracker from a granular raw material such as rice, corn or the like grain without resorting to the use of bonding agents.

Another object of the invention is to provide an apparatus for carrying out the above-mentioned method which can be implemented inexpensibly in a simplified structure.

The above and other objects, novel features and advantages of the invention will become more apparent from the description on an exemplary embodiment of the invention. The description makes reference to the drawings.

DETAILED DESCRIPTION OF THE PREFERRED EMBODIMENTS

Figure 1:
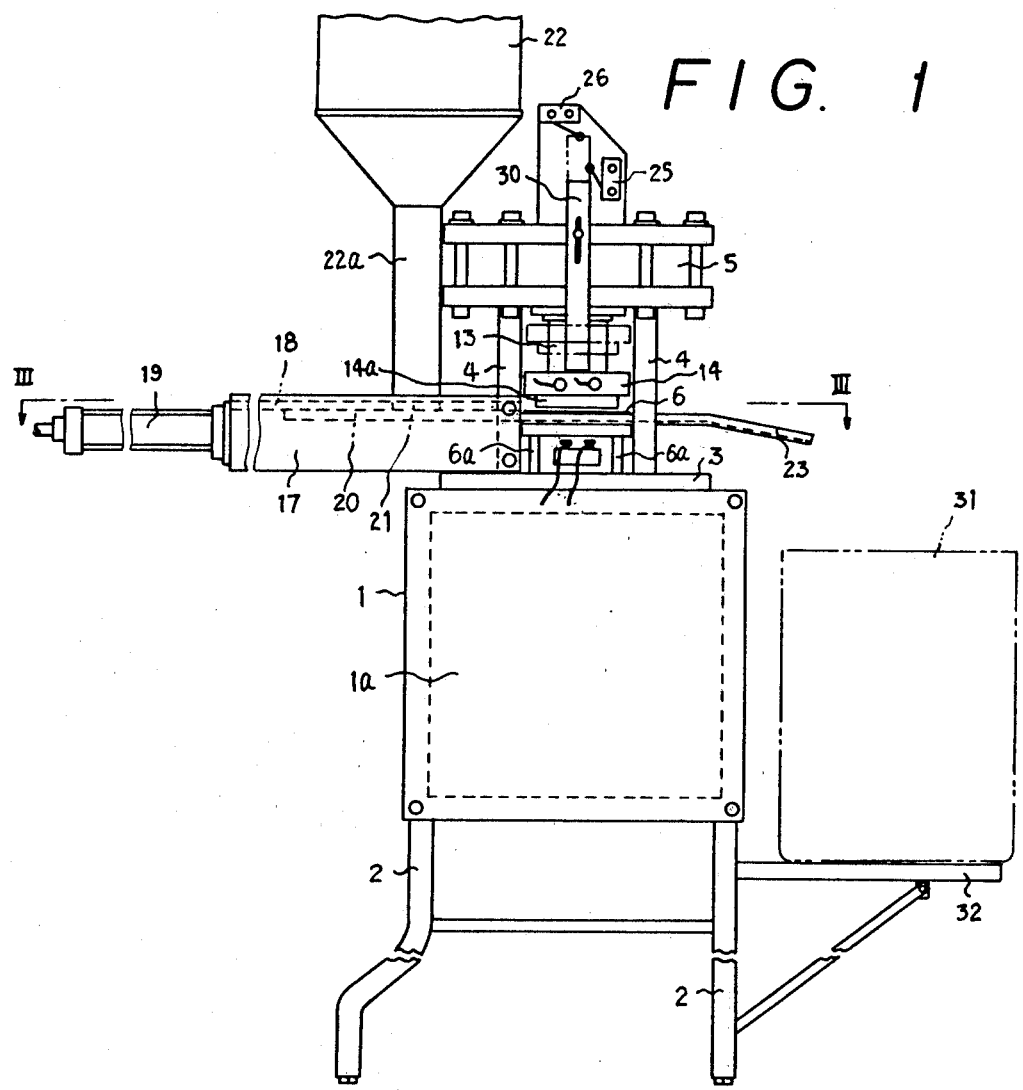
FIG. 1 is a front view of an apparatus according to an embodiment of the invention.
Figure 2:
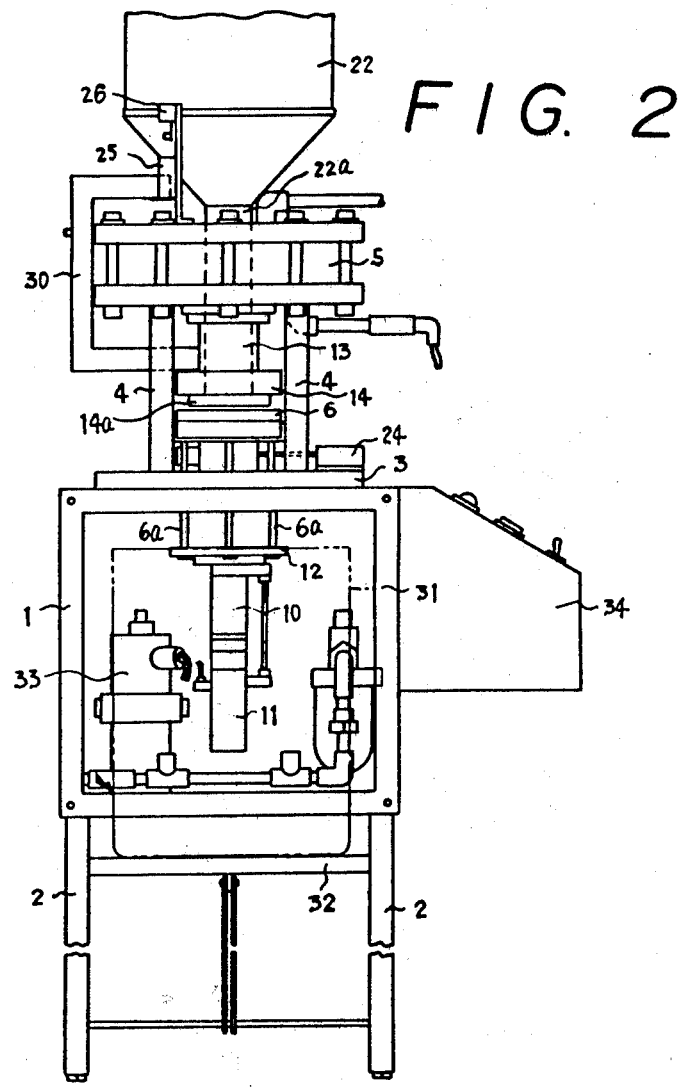
FIG. 2 is a side view of the same.
Figure 3:
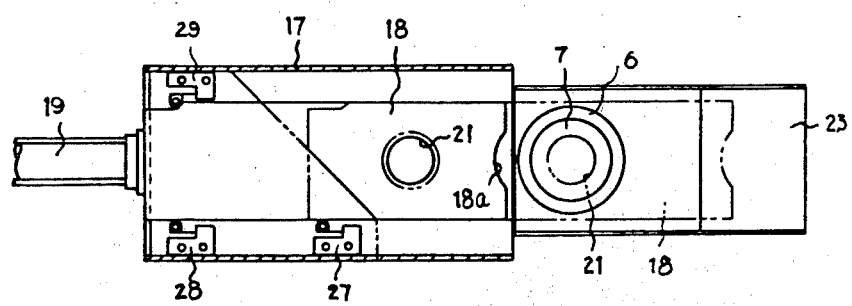
FIG. 3 is a sectional view of the same taken along the line III—III in FIG. 1, FIGS. 4 to 7 show enlarged fragmental views of a main portion of the apparatus shown in FIG. 1 to illustrate the operations thereof.
Figure 5:
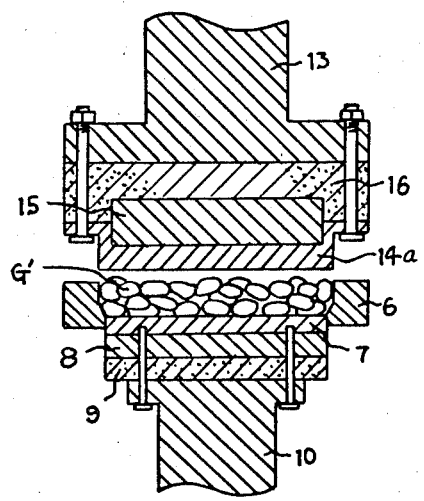
Figure 4:
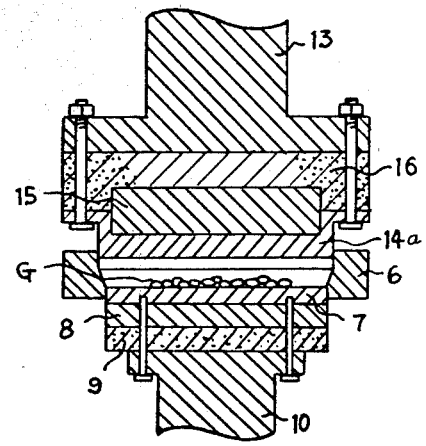
Figure 6:
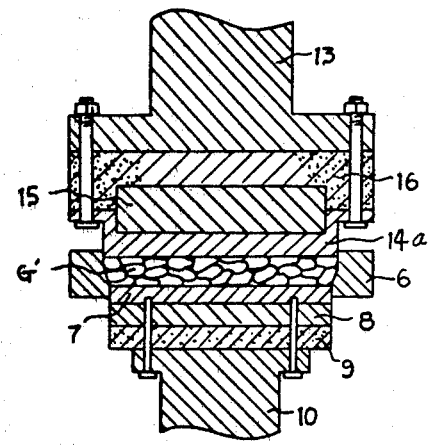
Figure 7:
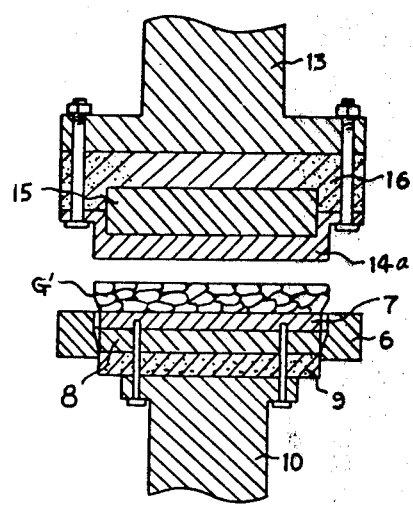

Referring to FIGS. 1 to 3 which show an apparatus according to the present invention, reference numeral 1 designates a box-like frame having four legs 2. Lateral sides of the box-like frame 1 are all closed by side plates, among which the front one 1a is pivotally mounted on the frame so that it can be opened and closed. Disposed fixedly on the top of the box-like frame 1 is a table 3 which supports a first air cylinder 5 of a disc-like configuration through four supporting columns 4. A lower baking mold 6 of an annular shape is stationarily and coaxially disposed above the table 3 through a plurality of supporting rods 6a and has a bottom plate 7 to which a heat insulating plate 9 incorporating an electric heater 8 therein is fixedly secured, as can be seen more clearly from FIGS. 4 to 6. The heat insulating plate 9 has a lower surface which is connected to a second upstanding air cylinder 11 disposed within the box-like frame 1 through a connecting rod 10. On the other hand, the second air cylinder 11 is suspended by a seat plate 12 which in turn is secured to the lower ends of the lower baking mold supporting rods 6a. It should be noted that the bottom plate 7 can be moved to the level of the upper edge of the lower baking mold 6 through actuation of the air cylinder 11, whereby the lower baking mold 6 as well as the bottom plate 7 can be heated by the heater 8.

Disposed above and in opposition to the lower baking mold 6 is an upper baking mold 14 which is connected to the bottom of the first air cylinder 5 by way of a vertical reciprocatable rod 13. An electric heater 15 is incorporated in the upper baking mold 14 with a heat insulating plate 16 interposed between the heat 15 and the suspending rod 13. The upper baking mold 14 has a protruding press seat 14a formed in the lower surface thereof. It should be noted that the press seat 14a of the upper baking mold 14 is of such shape and dimension as to be snugly received within the lower baking mold 6. The upper baking mold 14 is vertically movable through corresponding actuation of the first air cylinder 5. When the upper baking mold 14 is moved downwardly, the press seat 14a is snugly received within the lower baking mold 6 so that a chamber closed in a fluid-tight manner is defined within the lower baking mold 6 in cooperation with the press seat 14a of the upper baking mold 14.

A feeding plate 18 is slidably disposed within a casing 17 mounted at a rear side of the lower baking mold 6. A third air cylinder 19 is mounted on the casing 17 at the rear side of the feeding plate 18. The latter is adapted to be slidably moved over a lower plate 20 to thereby effect reciprocating movement over the lower baking mold 6. A through-hole 21 is formed in the feeding plate 18 at an intermediate portion and has an arcuate notch 18a formed at a front end thereof. Reference is to be made to FIG. 3. At a retracted or withdrawn position of the feeding plate 18, a conduit 22a extending from a hopper 22 is communicated to the casing 17 in an alignment with the through-hole 21. A mass of uncleaned or brown rice is accommodated within the hopper 22. A chute 23 extends forwardly from the lower baking mold 6.

Figure 8:
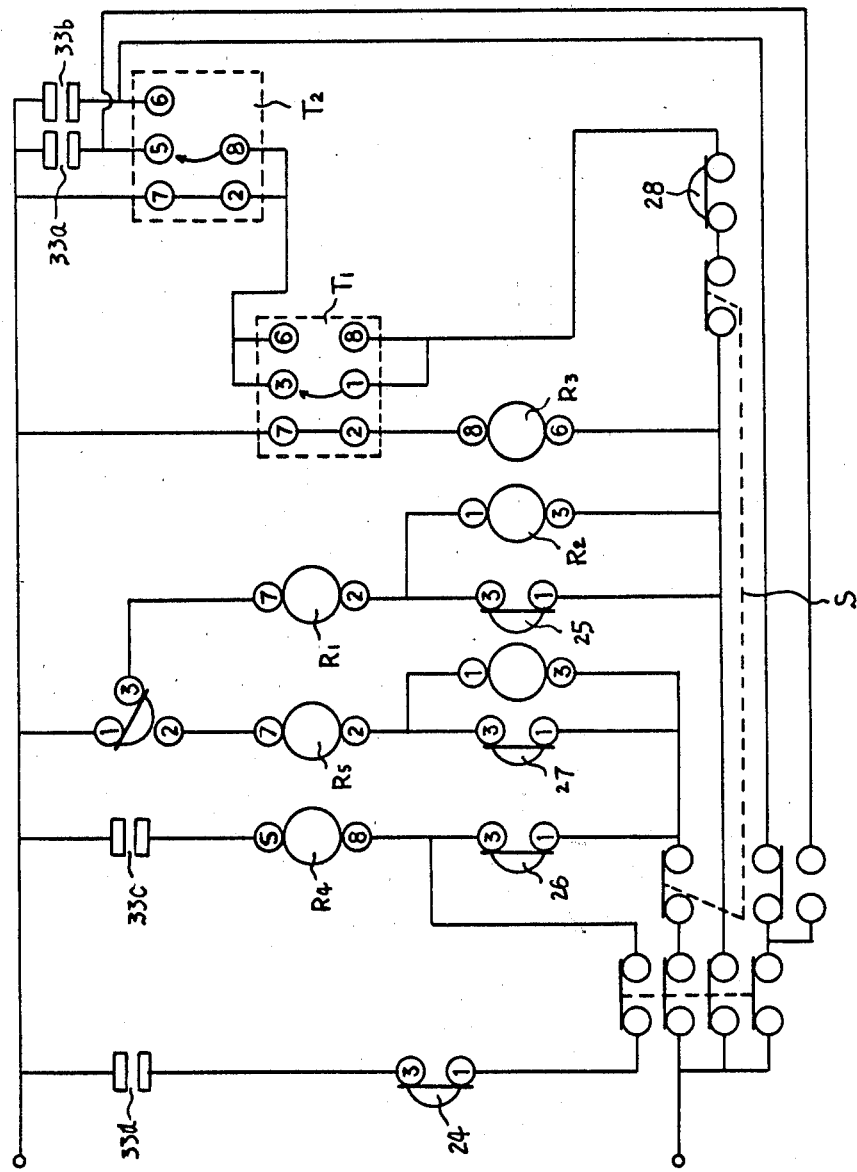
FIG. 8 is a circuit diagram showing an electrical circuit for controlling the operations of the apparatus.

The baking apparatus of the structure described above is provided with six limit switches in all. More specifically, a limit switch 24 is provided at a position to be actuated by the bottom plate 7 of the lower baking mold 6 upon upward movement thereof. Two limit switches 25 and 26 are actuated when the upper baking mold 14 is moved upwardly. The remaining three limit switches 27, 28 and 29 are adapted to be actuated upon sliding movement of the feeding plate 18. Actuation of the limit switches 25 and 26 is effected upon upward and downward movement of an arm 30 connected to the upper baking mold 14. Operations of these limit switches will be hereinafter described in conjunction with a circuit diagram shown in FIG. 8.

In the drawings, reference numeral 31 denotes a container located below a free end of the chute 23 and disposed on a base frame 32. Numeral 33 denotes a four-way electromagnetic valve of a solenoid type for controlling the operations of the first, second and the third cylinders. Finally, reference numeral 34 designates a switch box.

The raw material or uncleaned rice for producing a rice cracker may be prepared by mixing together some quantity of unhulled or brown rice of more than two kinds or brands, for example. The rice mixture is then cleaned by a rice washing machine and received in a basket to be left for 15 to 20 minutes for removing water. A predetermined quantity of salt is added to the dewatered unhulled rice to be intimately mixed therewith. Thereafter, the raw material is preparatorily dried for a day and then subjected to a primary drying process in a drying machine for two or three hours. After having been dried, the raw material rice mixture is loaded in the hopper 22. An appropriate quantity of laver or sesame seeds may be added, if desired.

Water content of the dried rice mixture provides a meaningful factor for carrying out the invention. The water content should be in the range of 15% to 20% and more preferably in a range of 17 to 18%. By the way, the water content is about 15 to 16% before the washing and about 30% immediately after the washing.

Next, a process for producing an unhulled rice cracker according to the invention will be described in conjunction with FIGS. 5 to 8.

The raw rice mixture loaded in the hopper 22 reaches to the through-hole 21 formed in the feeding plate 18 through the conduit 22a. The upper and the lower baking molds 14 and 6 are heated up to a temperature in a range of 160° C. to 180° C. with the upper baking mold being held at the upper position. At initiation of operation, the feeding plate 18 is moved forwardly to the position where the unhulled rice material G located within the through-hole 21 can be transferred into the lower baking mold 6. When the start switch S is closed at this stage, the air cylinder 5 is operated by the electromagnetic valve 33a through a closed circuit extending from the limit switch 28 (1-3) to the solenoid of the value 33a through a first timer T1 (1-3) and a second timer T2 (8-5), resulting in that the upper baking mold 14 is moved downwardly to be snugly fitted within the lower baking mold 6, whereby the unhulled rice material contained within the lower baking mold 6 is compressed and heated (refer to FIG. 4). At the same time, operation of the second timer T2 is triggered, as the result of which the timer position is changed over from the output 5 to 6 after the lapse of a preset time, whereupon the electromagnetic valve 33b is electrically energized to move upwardly the first air cylinder 5. As the consequence of the involved upward movement of the upper baking mold 14, the rice material G within the lower baking mold 6 is instantaneously fully expanded, while steam produced within the lower baking mold 6 is exhausted (refer to FIG. 5). Upon upward movement of the upper baking mold 14, the limit switch 25 is changed over from an open position (NO) to a closed position (NC), whereby a relay R1 is electrically energized through a closed circuit including the limit switch (1-3), the relay R1 (2-7) and the limit switch 29 (1-3). As the consequence of the actuation of the relay R1, relays R2 (1-3) and R3 (6-8) are changed over from the open or NO position to the close or NC position, whereby the first timer T1 (2-7) is caused to be initiated.

At the same time with the initiation of the first timer T1, the opened path (8-6) is closed. Upon lapse of the time preset at the first timer T1, the upward movement of the upper baking mold 14 is stopped, while the second timer T2 is restored to the position (8-5) from the position (8-6) when the first timer T1 is started. Consequently, the upper baking mold 14 is again caused to move downwardly to be snugly fitted within the lower baking mold 6. In this manner, the rice material G expanded within the lower baking mold 14 is compressed and shaped to produce a rice cracker G' from the unhulled or brown rice material (refer to FIG. 6).

Subsequently, after lapse of the time preset at the first timer T1, the second timer T2 is initiated and the position (8-5) is changed over to the position (8-6). Then, the electromagnetic valve 33b is energized. Although the limit switch 25 is closed, the first timer T1 continues to operate, to thereby allow the upper baking mold to be further moved upwardly. The upward movement of the upper baking mold 14 causes the limit switch 26 to change the NO position thereof over to the NC position, whereby the second air cylinder 11 is operated by the electromagnetic valve 33c through the closed path including the limit switch 26 (1-3) and the relay R4 (8-5). Thus, the bottom plate 7 of the lower baking mold is moved upwardly to lift the rice cracker G' to the height of the upper edge of the lower baking mold 6 (refer to FIG. 7).

Simultaneously with the upward movement of the bottom plate 7, the limit switch 24 is changed over to the NC or closed position from the NO position to energize the electromagnetic valve 33d so that the third air cylinder is actuated to move forwardly the feeding plate 18. Consequently, the rice cracker G' is caused to move outwardly through engagement with the arcuate notch 18a formed in the leading end of the feeding plate 18 and drop in the container 31 through the shoot 23. In the meantime, the limit switch 29 is changed over to the position (b) from (a) to thereby open the closed circuit for the relay R1, resulting in the resetting of the first timer from the position (8-6) to the position (1-3). Further, the limit switch 28 is changed over from the NC or closed position to the NO or open position to terminate the operation of the second timer T2, whereby the electromagnetic valve 33c is deenergized to allow the bottom plate 7 to be moved downwardly, while the feeding plate 18 is withdrawn rearwardly through deenergization of the electromagnetic valve 33d. The limit switch 27 is now in the open or OFF state, while the limit switch is closed with the limit switch 29 being changed over to the position (a). The apparatus is now reset to the starting position. It should be noted that when the produced rice cracker G' is moved outwardly from the lower baking mold toward the chute 23, the raw rice material G contained in the through-hole 24 is transported onto the bottom plate 7 of the lower baking mold 6 to be accommodated therein.

The process for producing the rice cracker has now been completed and the apparatus is now in the position ready to effect the next operation, which is repeated in the manner described above.

By virtue of the fact that the raw rice material is first heated and compressed in the hermetically closed chamber, caused to expand instantaneously by removing the compression and is again subjected to compression, unhulled or brown rice particles will stick to one another under action of moisture and fat contained in unhulled rice to form a rice cracker of a self-sustaining structure. The rice cracker is actually solidified to such a degree of rigidity that it may be softly and tastefully cracked or crunched by teeth. In this connection, it should be noted that a low water content in the raw rice material exhibits a low expansion coefficient unsuitable for shaping a rice cracker, while an excessively high water content brings about degradation in refreshingness of the crunching.

Although the apparatus disclosed herein is especially adapted for producing rice crackers, it will be appreciated that the invention can be applied to production of crackers of other kinds of cereals (corns) or grains. In summary, it is possible according to the teaching of the invention to produce crackers of unhulled rice or other grains exhibiting an improved tastefulness in crunching with a relatively simple structure of a small size apparatus within a relatively short production time. Thus, the invention is suited to be practiced on a large mass production basis with an enhanced efficiency. The products enjoy a high nutritive value.

Although the invention has been described in connection with a preferred embodiment thereof, it will be appreciated that many modifications and variations will readily occur to those skilled in the art without departing from the spirit and scope of the invention.

What is claimed is:

1. An apparatus for producing a cracker from a raw material such as rice or the like, comprising a lower baking mold having a bottom plate which is adapted to be heated and moved upwardly, an upper baking mold adapted to be selectively moved upwardly or downwardly relative to said lower baking mold and received within said lower baking mold in a fluid-tight manner, said upper baking mold being also adapted to be heated, and a slidable feeding plate for transporting a predetermined quantity of said raw material as supplied from a supply source, said feeding plate being adapted to serve both for pushing outwardly a shaped and self-sustaining cracker from said lower baking mold and for feeding said predetermined quantity of raw material into said lower mold when said upper baking mold is at a lifted position.

2. An apparatus for producing a cracker from a raw material such as rice or the like, comprising:
   a lower baking mold having a bottom plate which is adapted to be heated and moved upwardly;
   a first heater for heating said bottom plate;
   an upper baking mold for selectively moving upwardly or downwardly relative to said lower baking mold in a fluid-tight manner, said upper baking mold also suited for heating by a second heater;
   control means for compressing and heating for a predetermined time said raw material contained within a hermetically closed chamber defined in said upper and lower baking molds, expanding instantaneously said compressed and heated raw material by opening said baking molds and concurrently discharging steam produced within said chamber during said expanded material by means of said baking molds; and
   a slidable feeding plate for transporting a predetermined quantity of said raw material as supplied from a supply source, said feeding plate suited both for pushing outwardly a shaped and self-sustaining cracker from said lower baking mold and for feeding said predetermined quantity of raw material into said lower mold when said upper baking mold is at a lifted position.

* * * * *